US009880871B2

(12) United States Patent
Tsirkin et al.

(10) Patent No.: US 9,880,871 B2
(45) Date of Patent: Jan. 30, 2018

(54) PROTECTION FROM GUEST INTERRUPTS IN A VIRTUAL MACHINE FUNCTION

(71) Applicant: Red Hat Israel, Ltd., Ra'anana (IL)

(72) Inventors: Michael Tsirkin, Ra'anana (IL); Paolo Bonzini, Milan (IT)

(73) Assignee: Red Hat Israel, Ltd., Ra'anana (IL)

( * ) Notice: Subject to any disclaimer, the term of this patent is extended or adjusted under 35 U.S.C. 154(b) by 157 days.

(21) Appl. No.: 15/051,405

(22) Filed: Feb. 23, 2016

(65) Prior Publication Data

US 2017/0242721 A1   Aug. 24, 2017

(51) Int. Cl.
*G06F 9/455* (2006.01)
*G06F 9/48* (2006.01)

(52) U.S. Cl.
CPC ........ *G06F 9/45558* (2013.01); *G06F 9/4812* (2013.01); *G06F 2009/45583* (2013.01); *G06F 2009/45587* (2013.01)

(58) Field of Classification Search
CPC ......... G06F 9/4812; G06F 2009/45587; G06F 2009/45583
See application file for complete search history.

(56) References Cited

U.S. PATENT DOCUMENTS

| 9,117,081 | B2 | 8/2015 | Lukacs et al. |
| 9,129,106 | B2 | 9/2015 | Sharif et al. |
| 2013/0276057 | A1 | 10/2013 | Smith et al. |
| 2014/0013326 | A1 | 1/2014 | Neiger et al. |
| 2014/0173628 | A1 | 6/2014 | Ramakrishnan Nair |
| 2014/0283056 | A1 | 9/2014 | Bachwani et al. |
| 2014/0380009 | A1 | 12/2014 | Lemay et al. |
| 2015/0199514 | A1* | 7/2015 | Tosa ...................... G06F 21/554 726/17 |
| 2015/0370590 | A1* | 12/2015 | Tuch ................... G06F 9/45558 718/1 |

(Continued)

OTHER PUBLICATIONS

Jun Nakajima, Intel Update, retrieved from http://www.slideshare.net/xen_com_mgr/intel-update on Feb. 23, 2016, pp. 1-2.

(Continued)

*Primary Examiner* — Lewis A Bullock, Jr.
*Assistant Examiner* — Kevin X Lu
(74) *Attorney, Agent, or Firm* — Haynes and Boone, LLP (57) ABSTRACT

An example method for secure virtual machine access to a protected virtual machine function includes storing a first virtual machine function instruction, which is executable to configure access privileges of a guest according to a trampoline view, as a last instruction on a first trampoline page. The method also includes storing a clear interrupt flag instruction as a first instruction on a second trampoline page. The method further includes storing a second virtual machine function instruction, which is executable to configure access privileges of the guest according to a protected view, as a last instruction on the second trampoline page. The method also includes in response to detecting an extended page fault violation while the trampoline view is active, clearing the interrupt flag of the guest and entering execution on an instruction following the clear interrupt flag instruction on the second trampoline page.

20 Claims, 5 Drawing Sheets (56) References Cited

U.S. PATENT DOCUMENTS

2016/0179665 A1* 6/2016 LeMay .................. G06F 12/08
 711/154

OTHER PUBLICATIONS

Wenhao Li et al., Reducing World Switches in Virtualized Environment with Flexible Cross-world Calls, http://ipads.se.sjtu.edu.cn/_media/publications/crossover-isca15.pdf, Jun. 13-17, 2015, pp. 375-387.
David Durham, Mitigating Exploits, Rootkits and Advanced Persistent Threats, retrieved from http://www.hotchips.org/wp-content/uploads/hc_archives/hc26/HC26-10-tutorial-epub/HC26.10-tutorial1-HW-Security-epub/HC26.10.145-5_HotChips%20Mitigating%20Exploits6.pdf on Feb. 23, 2016, pp. 1-39.

* cited by examiner

FIG. 1

| Pages 202 | Primary View 216 | Trampoline View 218 | Protected View 220 |
|---|---|---|---|
| Guest Code and Data 204 | Read/Write/Execute | -/-/- | Read/Write/- |
| Virtual Machine Function Page Tables 206 | Read/-/Execute | Read/-/- | Read/Write/- or Read/-/- |
| First Trampoline Page 208 | Read/-/Execute | -/-/- | Read/-/Execute |
| Second Trampoline Page 210 | -/-/- | Read/-/Execute | -/-/- |
| Entry Point Page 212 | -/-/- | Read/-/- | Read/-/Execute |
| Extra Code Pages 214 | -/-/- | Read/-/- | Read/-/Execute |

A first virtual machine function instruction is stored as a last instruction on a first trampoline page, the first virtual machine function instruction executable to configure access privileges of a guest according to a trampoline view
402

A clear interrupt flag instruction is stored as a first instruction on a second trampoline page
404

A second virtual machine function instruction is stored as a last instruction on the second trampoline page, the second virtual machine function instruction executable to configure access privileges of the guest according to a protected view
406

In response to detecting an extended page fault violation while the trampoline view is active:

The interrupt flag of the guest is cleared
408

Execution on an instruction following the clear interrupt flag instruction on the second trampoline page is entered
410

PROTECTION FROM GUEST INTERRUPTS IN A VIRTUAL MACHINE FUNCTION

BACKGROUND

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

BRIEF SUMMARY

Methods, systems, and techniques are provided for handling guest interrupts. It may be desirable to provide protection from guest interrupts in a virtual machine function.

According to an embodiment, a method for secure virtual machine access to one or more protected virtual machine functions includes storing, by a hypervisor, a first virtual machine function instruction as a last instruction on a first trampoline page. The first virtual machine function instruction is executable to configure access privileges of a guest according to a trampoline view. The method also includes storing a clear interrupt flag instruction as a first instruction on a second trampoline page. The method further includes storing a second virtual machine function instruction as a last instruction on the second trampoline page. The second virtual machine function instruction is executable to configure access privileges of the guest according to a protected view. The method also includes in response to detecting an extended page fault violation while the trampoline view is active, clearing, by the hypervisor, the interrupt flag of the guest and entering execution on an instruction following the clear interrupt flag instruction on the second trampoline page.

According to another embodiment, a system for secure virtual machine access to one or more protected virtual machine functions includes an initialization module that stores a first virtual machine function instruction as a last instruction on a first trampoline page, stores a clear interrupt flag instruction as a first instruction on a second trampoline page, and stores a second virtual machine function instruction as a last instruction on the second trampoline page. The first virtual machine function instruction is executable to configure access privileges of a guest according to a trampoline view, and the second virtual machine function instruction is executable to configure access privileges of the guest according to a protected view. The system also includes an interrupt controller that in response to detecting an extended page fault violation while the trampoline view is active, clears the interrupt flag of the guest and enters execution on an instruction following the clear interrupt flag instruction on the second trampoline page.

According to another embodiment, a machine-readable medium includes a plurality of machine-readable instructions that when executed by one or more processors are adapted to cause the one or more processors to perform a method including: storing a first virtual machine function instruction as a last instruction on a first trampoline page, the first virtual machine function instruction executable to configure access privileges of a guest according to a trampoline view; storing a clear interrupt flag instruction as a first instruction on a second trampoline page; storing a second virtual machine function instruction as a last instruction on the second trampoline page, the second virtual machine function instruction executable to configure access privileges of the guest according to a protected view; and in response to detecting an extended page fault violation while the trampoline view is active: clearing the interrupt flag of the guest; and entering execution on an instruction following the clear interrupt flag instruction on the second trampoline page.

According to another embodiment, an apparatus for secure virtual machine access to one or more protected virtual machine functions includes means for storing a first virtual machine function instruction as a last instruction on a first trampoline page, the first virtual machine function instruction executable to configure access privileges of a guest according to a trampoline view; means for storing a clear interrupt flag instruction as a first instruction on a second trampoline page; means for storing a second virtual machine function instruction as a last instruction on the second trampoline page, the second virtual machine function instruction executable to configure access privileges of the guest according to a protected view; and means for in response to detecting an extended page fault violation while the trampoline view is active: clearing the interrupt flag of the guest; and entering execution on an instruction following the clear interrupt flag instruction on the second trampoline page.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the leftmost digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Additionally, in the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Unless specifically stated otherwise, as apparent from the following discussion, it is appreciated that throughout the description, discussions utilizing terms such as "determining," "storing," "configuring," "receiving," "clearing," "reading," "requesting," "reentering," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
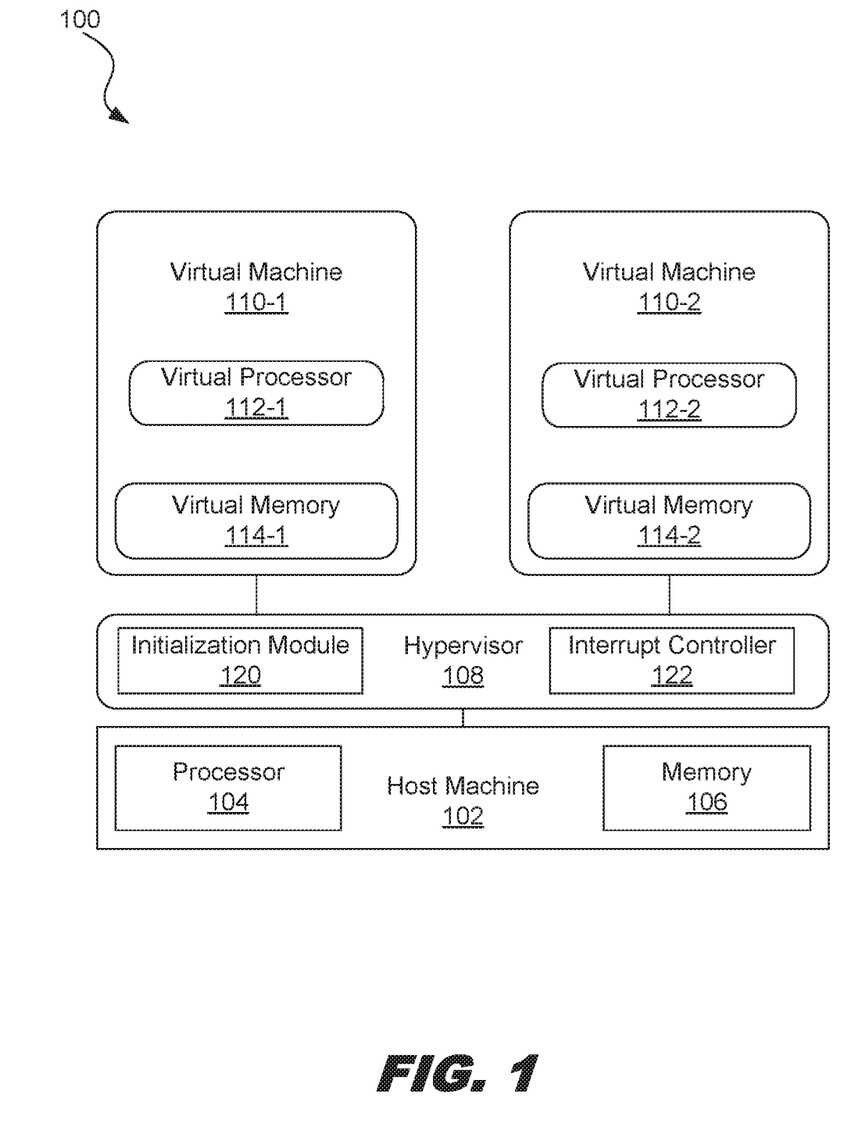
FIG. 1 is a diagram showing an illustrative host system, in accordance with various examples of the present disclosure.

FIG. 1 is a diagram showing an illustrative host system 100. According to the present example, a physical system, such as host machine 102 includes hardware such as processor 104 for executing software (e.g., machine readable instructions) and using or updating data stored in memory 106. Processor 104 may represent one or more processors acting in concert. A "processor" may also be referred to as a "CPU" or "physical processor" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and are often referred to as "working memory." The various types of memory may store information in the form of software and data. The software may include an operating system, hypervisor 108, and various other software applications.

The hypervisor 108 supports a first virtual machine 110-1 having a first virtual processor 112-1 and a first virtual memory 114-1. The hypervisor 108 also supports a second virtual machine 110-2 having a second virtual processor 112-2 and a second virtual memory 114-2. Although two virtual machines 110 are illustrated, other examples include fewer than two virtual machines or more than two virtual machines.

In the present example, virtual machines 110 are platforms on which operating systems referred to as guest operating systems run. The guest operating systems may be referred to as "guests." A guest running on the first virtual machine 110-1 may be a different operating system than another guest running on the second virtual machine 110-2. Guests may also be different operating systems than the operating system running on host machine 102.

Hypervisor 108 manages host machine 102 resources and makes them available to one or more guests that may be alternately or concurrently executed by the host machine 102. Hypervisor 108 may manage hardware resources and arbitrates requests of the multiple guests. For example, hypervisor 108 may present a virtual set of CPU, memory, I/O, and disk resources to each guest based on the physical hardware and/or based on a standard and consistent selection of custom hardware. A virtual machine 110 is provided its own address space in memory, its own processor resource allocation, and its own device input/output (I/O) using its own virtual device drivers.

The hardware resources of the host machine 102 are shared among the hypervisor 108 and one or more guests. The hypervisor 108 can map a virtual resource or state (e.g., registers, memory, or files) to resources in the underlying host machine 102. For example, the hypervisor 108 may present a virtual memory 114-1 to virtual machine 110-1 and may also present a virtual memory 114-2 to virtual machine 110-2.

The hypervisor 108 maps the memory locations of virtual memory 114, referred to as virtual memory locations, to physical memory locations of memory 106 using page tables, which may be referred to as virtual machine function page tables. These pages tables may be stored in a virtual memory, such as virtual memory 114-1 in order to be accessible to a virtual machine 110-1. A page table may be a data structure that stores mappings between the virtual addresses of the virtual machine 110 and the physical addresses of memory 106. A page table may be a hypervisor page table that maps guest physical addresses to host physical addresses. A hypervisor page table may also be referred to as an extended page table.

The hypervisor 108 includes an initialization module 120 and an interrupt controller 122. Initialization module 120 sets up trampoline pages, stores instructions in the trampoline pages, and orders pages for execution by a guest running on a virtual machine. Interrupt controller 122 may enable and/or disable guest interrupts in a virtual machine function.

Figure 2:
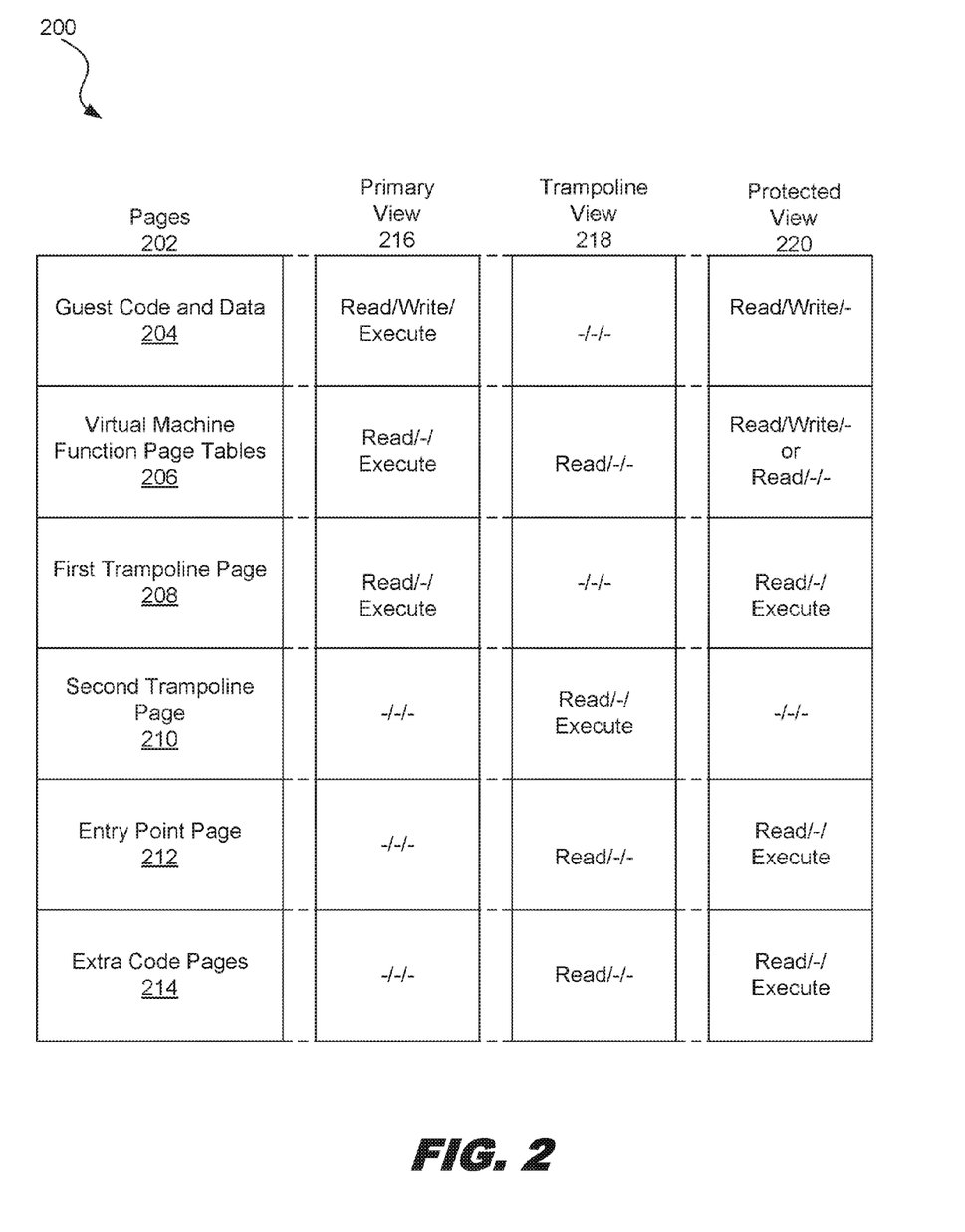
FIG. 2 is a diagram showing an illustrative assignment of page access privileges for each defined view, in accordance with various examples of the present disclosure.

The hypervisor 108 provides sets of access privileges, referred to as "views," which define a virtual machine's privileges to different pages. FIG. 2 is a diagram showing an illustrative assignment of page access privileges configured for each defined view. The example illustrated in FIG. 2 has three defined views, which are primary view 216, trampoline view 218 and protected view 220. Although three views are illustrated, it should be understood that fewer than three views or more than three views are within the scope of the present disclosure.

A guest may default to primary view 216. The trampoline view 218 is used for transitioning from primary view 216 to protected view 220. Accordingly, guest operations using the trampoline view 218 may be ephemeral in nature. Protected view 220 is used for executing protected functions. In some examples, these instructions include writing to the guest code and data pages of another virtual machine. Protected view 220 may configure access privileges to allow execution of instructions stored on the protected pages and the first trampoline page 208. Protected view 220 may be configured to prohibit execution of instructions that are stored on at least one page other than the protected pages or the first trampoline page 208. A protected page may store instructions for a protected function.

Each view provides the access privileges for the page subsets. For example, the access privileges for the guest code and data pages 204 are read, write, and execute (i.e., full access) while the guest is configured to use primary view 216. Read privileges allow the guest to read data on the pages. Write privileges allow the guest to remove, add, or modify data on the pages. Execute privileges allow the guest to execute instructions that are written on the pages.

In the example illustrated in FIG. 2, a memory includes a plurality of pages 202 that include guest code and data pages 204, virtual machine function page tables pages 206, first trampoline page 208, second trampoline page 210, entry point page 212, and extra code pages 214. A page represents a subset of virtual memory that may be used to store data. The pages 202 are categorized into subsets. Page subsets include guest code and data pages 204, virtual machine function page tables 206, a first trampoline page 208, a second trampoline page 210, an entry point page 212, and extra code pages 214. Each page in a subset of pages has the same access privileges as other pages in its page subset. For example, pages in the guest code and data pages 204 have the access privileges defined for the guest code and data pages. In another example, first trampoline page 208 and second trampoline page 210 are in different page subsets and therefore have separately defined access privileges.

Guest code and data pages 204 store software executed by the guest operating system on the virtual machine, such as software installed by users of the guest operating system. The virtual machine function page tables 206 store page tables that a guest accesses in order to determine locations of the pages 202 in order to switch between page subsets and pages within the page subsets. The hypervisor 108 may store instructions on the trampoline pages and protected pages, which live in guest memory. For example, the hypervisor 108 may configure a first virtual machine function page table to order the second trampoline page 210 after the first trampoline page 208, and configure a second virtual machine function page table to order one or more protected pages after the second trampoline page 210. The first virtual machine function page table may be the same as or different from the second virtual machine function page table.

The hypervisor 108 may configure the virtual machine function page tables 206 to order the pages such that following execution of the last instruction on the first trampoline page 208, the first instruction on the second trampoline page 210 is executed. The entry point page 212 is configured to be executed following execution of the second trampoline page 210. Following execution of the last instruction on the second trampoline page 210, the first instruction on the entry point page 212 is executed. Extra code pages 214 may be configured to be executed following the execution of the last instruction on the entry point page 212. The entry point page 212 and the extra code pages 214 are referred to as "protected pages." References to the protected pages may refer to either the entry point page 212 or the extra code page 214. A protected page stores one or more instructions for a protected function.

The guest may view the pages and execute instructions stored on the pages (e.g., a jump instruction, a virtual machine function, etc.). A guest may default to primary view 216. While in the primary view 216, a guest has read and execute access to the virtual machine function page tables. Accordingly, the guest has access privileges to read addresses of pages identified in the page tables. In some examples, a page table mapping outputs an address of a page that the guest is attempting to locate, the address being stored in a data structure. Some examples of data structures that may be used to store the address include a register, a pointer, a queue, and a stack. The guest may use the address by loading the address into a register, and perform an execute operation of the instruction stored at that address stored in the register.

The first trampoline page 208 and the second trampoline page 210 include instructions to secure the computing environment prior to executing a virtual machine function to change the view. The virtual machine function may be referred to as VMFUNC. A VMFUNC enables a guest to switch page tables, thus switching views of guest memory, without exiting to the hypervisor. Exits to the hypervisor may be time consuming. In some examples, the virtual machine function is configured to be executed only from the first trampoline page 208 and the second trampoline page 210. Accordingly, the trampoline pages are configured to protect the computing environment by structuring the instructions in the pages in a certain manner. The virtual machine function stored on the first trampoline page 208 may be an instruction to change the view to the trampoline view 218. The virtual machine function stored on the second trampoline page 210 may be an instruction to change the view to the protected view 220. In an example, a trampoline page may be a single page. In another example, a trampoline page may include more than one page.

In some examples, a jump instruction is stored in the first trampoline page 208 and the second trampoline page 210 at or near the start of the page. The placement of the jump instruction allows for instructions in the middle of a page to be skipped. In some examples, the jump instruction is executed in order to skip to the last instruction on the page. In some examples, a virtual machine function instruction is stored at the end of the first trampoline page 208 and the second trampoline page 210, such that execution following the change of the view continues onto the next page. By placing the virtual machine function instruction at the end of the page, the next instruction is loaded from a different page. Therefore, the page executing the virtual machine function instruction is inaccessible from the changed view, and the next page is inaccessible from the original view. After executing the instruction to change the view, the next instruction executed is the instruction placed in the page following the particular trampoline page. The placement of the virtual machine function instruction at the end of the page avoids execution of instructions on the page using an unintended view.

The trampoline view 218 may configure access privileges to disallow reads and writes of any page. The disallowance of reads from and writes to any page provides an environment in which interrupts are disabled (or blocked). The disabled interrupts may be guest interrupts. It may be desirable to disable guest interrupts while a protected function (e.g., hypervisor code) is running so that a full exit from the guest to the hypervisor does not occur.

The second trampoline page 210 may include a clear interrupt flag instruction that is stored before a virtual machine function on the second trampoline page. The clear interrupt flag instruction may be stored as the first instruction on the second trampoline page 210, prior to a jump instruction that causes execution to flow to a second virtual machine function stored on the second trampoline page 210. Execution of the clear interrupt flag instruction disables interrupts of the guest (e.g., guest interrupts) running on the virtual machine. While the guest is running, a protected function may be executed without performing a full exit to the hypervisor. Typically, when switching to a protected view, interrupts are not disabled. An interrupt may occur after the first virtual machine function on the first trampoline page 208 is executed, thereby switching to the trampoline view 218, but before the instruction to disable interrupts on the second trampoline page 210 is executed. If an interrupt occurs, a full exit to the hypervisor may occur. It may be desirable to disable interrupts before executing a protected function in order to prevent a full exit to the hypervisor from occurring while the protected function is being executed, thus conserving time.

The entry point page 212 and the extra code pages 214 are distinguished in that the entry point page 212 is the first protected page, which is accessed following the execution of a view change instruction in the second trampoline page 210. In the present example, the entry point page 212 and the extra code pages 214 include instructions to perform protected functions to which a guest would not have access privileges to execute in the primary view 216 or the trampoline view 218. In some examples, the protected functions may include instructions that may be executed to write to the memory of another virtual machine that is being executed by the hypervisor. The extra code pages 214 are available for any additional data that does not fit on the entry point page 212. The extra code pages 214 may include additional instructions that there may not be storage space for in the entry point page 212. Accordingly, following execution of instructions in the entry point page 212, instructions may be executed from the extra code pages 214.

In the example illustrated in FIG. 2, the guest does not have read, write, or execute access privileges to the protected pages in the primary view 216. Therefore, if a guest is to execute instructions on the protected pages, the guest would enter the first trampoline page 208 in order to execute an instruction to change the view to the trampoline view, execute instructions on the second trampoline page 210 to secure the environment, and execute an instruction on the second trampoline page 210 to change the view to the protected view 220. Once in the protected view 220, the guest has execute access privileges to instructions in the protected pages 212 and 214. The environment may be secured by disabling interrupts before execution of a protected function.

Access to the virtual machine function that changes the views is restricted such that the virtual machine function is executed from the first trampoline page 208 or the second trampoline page 210, but not the guest code and data pages 204, the virtual machine function page tables 206, the entry point page 212, or the extra code pages 214. A guest that attempts to execute a virtual machine function to change the view, in a page other than a trampoline page, may result in an exit from the virtual machine or an error. Accordingly, to access the protected functions, the guest enters the trampoline pages in order to execute the virtual machine function to change the view.

While in the primary view 216, the guest has read and execute privileges to the virtual machine function page tables, which allows the guest to swap to another page such as the first trampoline page 208. When the guest changes to the trampoline view 218, the guest's access privileges for the guest code and data pages 204 is set to no access (i.e., no read access, no write access and no execute access), and the guest's access privileges for the entry point page 212 and extra code pages 214 are set to read access. Removing access privileges to the guest code and data pages 204 while in the trampoline view 218 provides a security measure to prevent a guest from executing potentially malicious instructions that a guest may have stored in the guest code and data pages 204.

After the guest executes the first virtual machine function stored in the first trampoline page 208, the guest may execute the first instruction stored in the second trampoline page 210. In keeping with the above example, the first instruction stored in the second trampoline page 210 may be a clear interrupt flag instruction. Execution of the clear interrupt flag instruction by the guest causes guest interrupts to be disabled.

After the guest executes the clear interrupt flag instruction stored on the second trampoline page 210, the guest may execute the instructions on the second trampoline page 210. Zero or more instructions may be between the clear interrupt flag instruction and a second virtual machine function executable to configure access privileges according to protected view 220. In an example, the next instruction after the clear interrupt flag instruction is the last instruction in the second trampoline page 210. The last instruction may be the second virtual machine function. In another example, an instruction after the clear interrupt flag instruction stored on the second trampoline page 210 is a jump instruction. The jump instruction may cause the guest to jump to the last instruction on the second trampoline page 210, which may be the second virtual machine function.

When the guest view changes to protected view 220, such as by executing the second virtual machine function instruction stored on the second trampoline page 210, the guest's access privileges for the guest code and data pages 204 is set to read and write access (i.e., there is read and write access but no execute access). While in protected view 220, the guest has read and execute access to the entry point page 212 and extra code pages 214. These access privileges allow for executing protected virtual machine functions stored in the entry point page 212 and extra code pages 214. In some examples, these protected functions are used to access hypervisor data or data of another virtual machine.

In some examples, hypervisor 108 detects an extended page fault violation while the trampoline view 218 is active. Trampoline view 218 is active if the guest's view of the page tables is the trampoline view. If the guest's view of the page tables is the trampoline view, then the trampoline view is active. While in the trampoline view 218, various events may occur that cause the extended page fault violation, which may cause a full exit out of the guest and to the hypervisor. In some examples, execution of the second trampoline page 210 while the guest is in user mode causes the extended page fault violation. In an example, protected view 220 may configure access privileges to allow execution of instructions from guest supervisor mode stored on the protected pages and the first trampoline page 208. Protected view 220 may be configured to prohibit execution from guest supervisor mode of instructions that are stored on at least one page other than the protected pages or the first trampoline page 208. In this example, the guest may have executed instructions stored on a page other than the protected pages or the first trampoline page 208, causing the extended page fault violation.

In some examples, the extended page fault violation may occur in response to the guest invoking the first virtual machine function executable to configure access privileges according to the trampoline view 218. In some examples, the extended page fault violation may occur in response to the guest invoking the second virtual machine function executable to configure access privileges according to the protected view 200.

In some examples, the processor 106's access to an interrupt descriptor table (IDT) may cause the extended page fault violation. An IDT is a data structure to implement an interrupt vector table. The IDT may be used by processor 106 to determine the correct response to interrupts and exceptions. Although an IDT is described, it should be understood that any data structure that is used by a processor to determine the correct response to an interrupt may be used. In some examples, executing the clear interrupt flag instruction from unprivileged code causes the processor 106 to access the IDT. In some examples, a hardware interrupt causes the processor 106 to access the IDT. The hardware interrupt may be a posted interrupt. A posted interrupt is an interrupt that the processor 104 may inject into the destination virtual processor without help from the hypervisor 108. Unlike other interrupt sources, posted interrupts do not require an exit from the guest to the hypervisor 108. Virtual processors and devices may be sources for posted interrupts.

In response to detecting an extended page fault violation while the trampoline view is active, the hypervisor 108 may clear the interrupt flag of the guest running on the virtual machine, request an interrupt window exit to inject an interrupt, and enter execution on an instruction following the clear interrupt flag instruction on the second trampoline page 210. Hypervisor 108 clears the interrupt flag of the guest because the clear interrupt flag instruction stored on the second trampoline page 210 did not execute. Accordingly, hypervisor 108 may clear the interrupt flag of the guest on behalf of the guest. An interrupt may cause the extended page fault violation while the trampoline view 218 is active. To inject this interrupt into the guest domain at a later point in time, hypervisor 108 may request the interrupt window exit.

The request for an interrupt window indicates to processor 106 to exit to the hypervisor as soon as interrupts are enabled. When the hypervisor 108 enables the interrupt window exit, the processor 104 may exit to the hypervisor 108 as soon as it is possible to inject an interrupt. In an example, the interrupt flag is set if interrupts are enabled. In this example, if interrupts are enabled, the hypervisor 108 may inject an interrupt. Likewise, the interrupt flag is cleared if interrupts are disabled. In this example, if interrupts are disabled, the hypervisor 108 is unable to inject an interrupt. This is not intended to be limiting, and it should be understood that other embodiments in which a cleared interrupt flag indicates that interrupts are enabled and a set interrupt flag indicates that interrupts are disabled are within the scope of the present disclosure. The interrupt window exit is a mechanism that allows the processor 104 to indicate to the hypervisor 108 whether it is possible to inject an interrupt. After the interrupt flag of the guest is cleared, hypervisor 108 may then resume execution at the instruction following the clear interrupt flag instruction on the second trampoline page 210. An exit from the hypervisor and to the guest may occur, whereby instruction flow proceeds to the instruction following the clear interrupt flag instruction by reentering the guest.

As discussed, an interrupt flag of the guest may be cleared to disable guest interrupts. In some examples, the interrupt flag is cleared by setting the interrupt flag to zero. In some examples, the interrupt flag is cleared by setting the interrupt flag to one.

Figure 3:
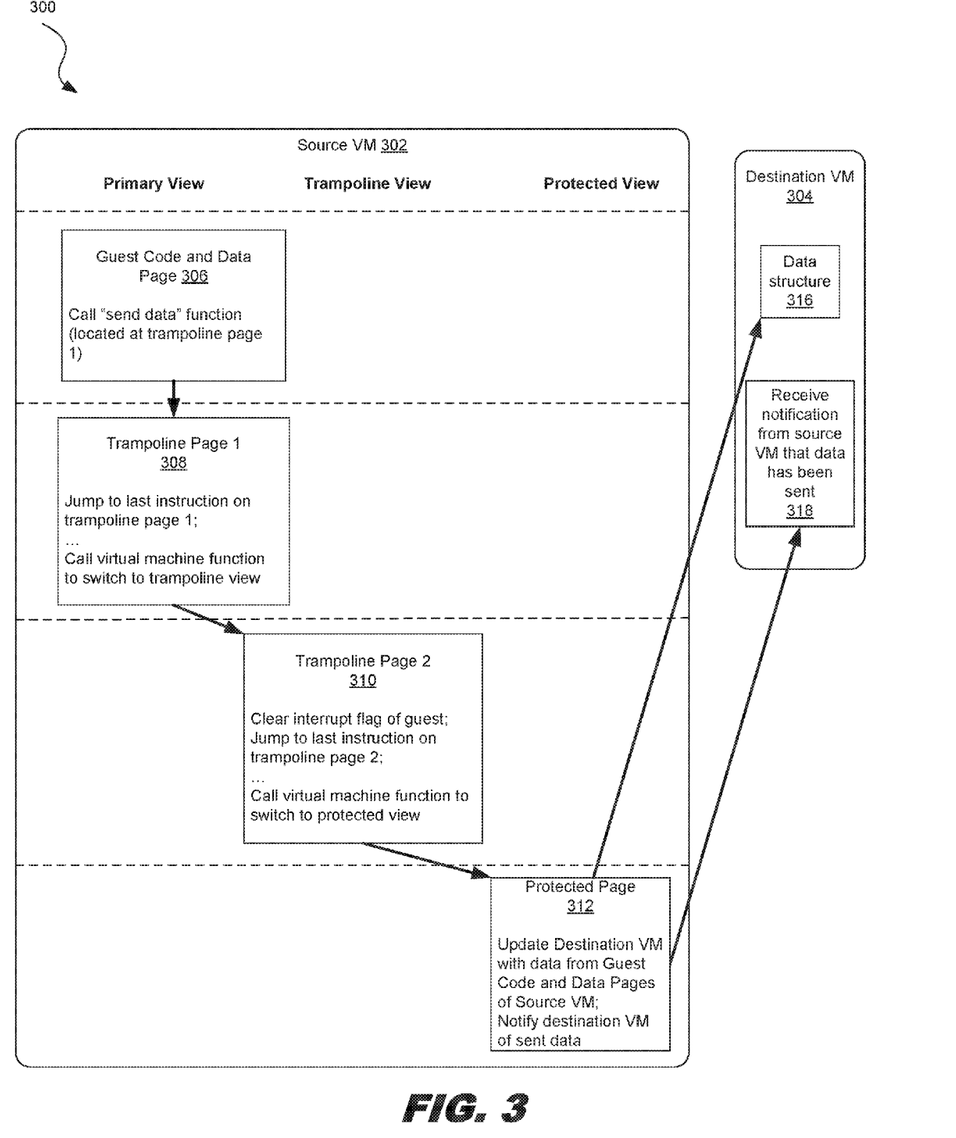
FIG. 3 is a flowchart showing an illustrative secure execution of a protected virtual machine function, in accordance with various examples of the present disclosure.

An example of a method for performing a protected function by traversing views and pages is described regarding FIG. 3. FIG. 3 is a flowchart 300 showing an illustrative secure execution of a protected virtual machine function. The method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof.

The method 300 allows a source virtual machine 302 to perform a protected virtual machine function. In the illustrated example, the protected virtual machine function is sending data from the source virtual machine 302 to a destination virtual machine 304, where both virtual machines are run by a hypervisor executing on a host. It should be understood that other protected virtual machine functions are within the scope of the present disclosure.

At block 306, guest code and data pages include an instruction to call a function to send data to the destination virtual machine. In some examples, the send data function is a function to send one or more packets of data. In the present example, the guest is operating in the primary view, and therefore has read, write, and execute access to the guest code and data pages. This read, write, and execute access allows the guest to prepare data for sending, such as by writing the data to data structures in the guest code and data pages, and well as execute the call of the send data function, the function call being stored in the guest code and data pages.

In the present example, the send data function is located at the start of trampoline page 1. Therefore, the call of the function begins execution of the send data function instructions at the start of trampoline page 1.

At block 308, the instructions include any additional preparations to send the data. The instructions include an instruction to jump to the last instruction on trampoline page 1. In some examples, the instruction at the end of trampoline page 1 is three bytes in length. In these examples, the instruction will start three bytes prior to the end of the page, such that the instruction is the last instruction on the page. The jump to the last instruction on the page provides that, after the last instruction on trampoline page 1 is executed, then execution will continue on trampoline page 2.

In the present example, the last instruction on trampoline page 1 is a virtual machine function that is executed to change the view to the trampoline view. The trampoline view provides no access privileges to trampoline page 1, therefore enforcing no further instructions being executed on trampoline page 1. While in the trampoline view, the source virtual machine gains access permissions of read and execute for trampoline page 2. Additionally, the trampoline view is configured with no access privileges to trampoline page 1. Next, since the instruction to change the view to the trampoline view was the last instruction on the page, execution continues on the next page, which is trampoline page 2.

By removing access privileges to trampoline page 1 and placing the location of the instruction to change to the trampoline view at the end of trampoline page 1, risk is mitigated that any additional instructions could be executed on trampoline page 1.

While the trampoline view is active, an extended page fault violation may occur. In response to detecting an extended page fault violation while the trampoline view is active, the hypervisor may clear the interrupt flag of a guest running on the virtual machine, request an interrupt window exit to inject an interrupt, and enter execution on an instruction following the clear interrupt flag instruction on the trampoline page 2.

Process flow 300 may proceed to block 310 if the guest executes an instruction on the trampoline page 2. At block 310, execution of trampoline page 2 begins by executing instructions at the start of the page to clear an interrupt flag of the guest. The clear interrupt flag instruction disables interrupts. Trampoline page 2 also includes an instruction to jump to the last instruction on trampoline page 2. In some examples, the instruction at the end of trampoline page 2 is three bytes in length. In these examples, the instruction will start three bytes prior to the end of the page such that the instruction is the last instruction on the trampoline page 2. The last instruction on trampoline page 2 changes the view to the protected view. Once in the protected view, the source virtual machine 302 gains permissions to read and execute instructions stored in the entry point page and the extra code pages. The protected view sets the access privileges to the trampoline page 2 to no access. By removing access privileges to trampoline page 2 and placing the location of the instruction to change to the protected view at the end of trampoline page 2, risk is mitigated that any additional instructions could be executed on trampoline page 2.

Next, since the instruction to change the view to the protected view was the last instruction on the page, execution continues on the next page, which is the entry point page. The entry point page contains instructions that are configured to be executed to perform the protected virtual machine functions. In the illustrated example, at block 312, the protected virtual machine function updates a data structure 316 in the memory of a destination virtual machine 304 and at block 318 notifies the destination virtual machine 304 that the data structure 316 has been updated. A notification may be setting a flag in a memory location of a destination virtual machine 304. In the present example, the data that is used to update data structure 316 may be read from the guest code and data pages.

In the present example, once the execution of the protected virtual machine function is completed, execution returns back to trampoline page 1 immediately following the jump instruction on trampoline page 1. The next instruction executed on trampoline page 1 changes the view from the protected view to the primary view. The next instruction executed on the trampoline page 1 returns back from trampoline page 1 to the instruction following the function call executed on the guest code and data pages. Accordingly, the guest is able to execute a protected function. Following the execution of the protected function, the guest is placed back into the guest code and data pages, with the primary view restored.

Figure 4:
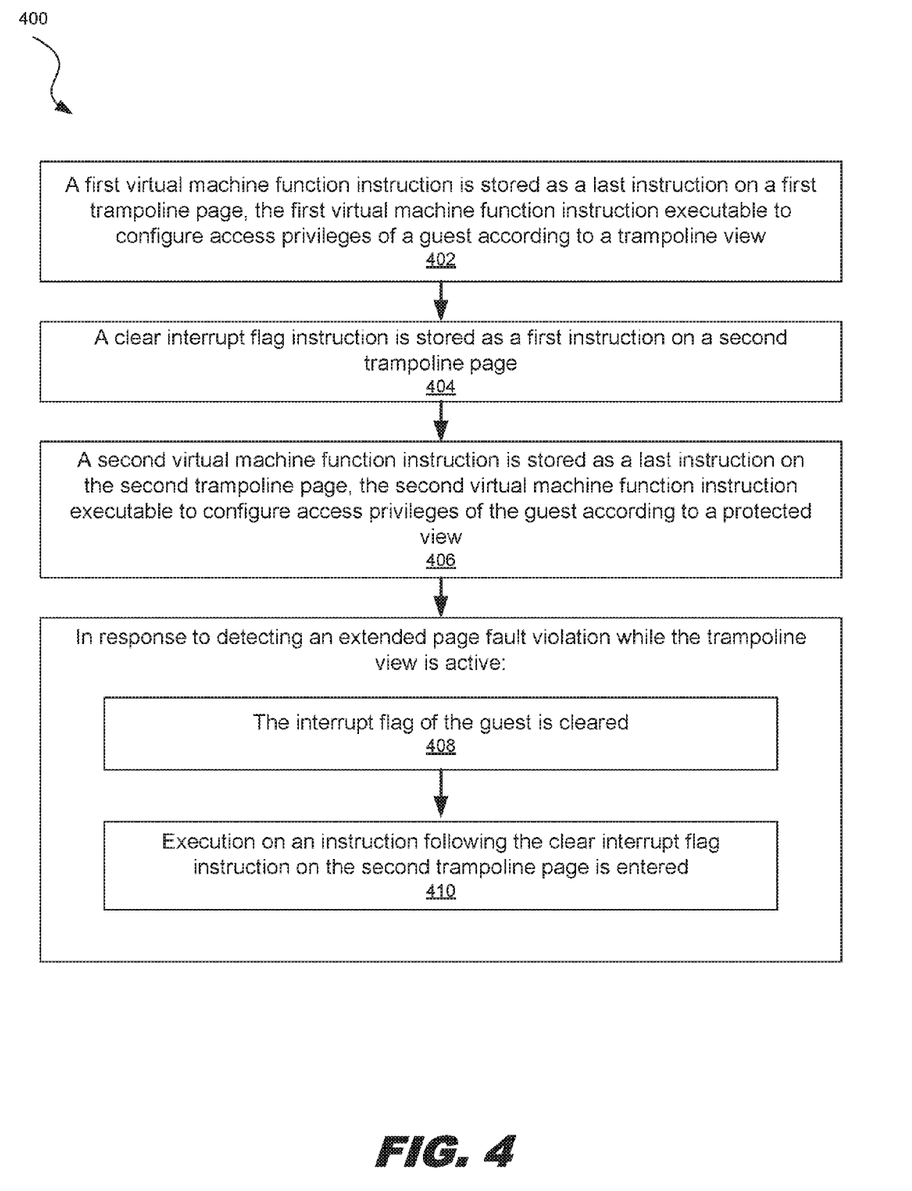
FIG. 4 is a flowchart showing an illustrative method of handling guest interrupts, in accordance with various examples of the present disclosure.

FIG. 4 is a flowchart illustrating a method 400 of handling guest interrupts, in accordance with various examples of the present disclosure. Method 400 is not meant to be limiting and may be used in other applications.

In FIG. 4, method 400 includes blocks 402-410. In a block 402, a first virtual machine function instruction is stored as a last instruction on a first trampoline page, the first virtual machine function instruction executable to configure access privileges of a guest according to a trampoline view. In an example, initialization module 120 stores a first virtual machine function instruction as a last instruction on the first trampoline page 208, the first virtual machine function instruction executable to configure access privileges of a guest according to the trampoline view 218.

In a block 404, a clear interrupt flag instruction is stored as a first instruction on a second trampoline page. In an example, initialization module 120 stores a clear interrupt flag instruction as a first instruction on the second trampoline page 210. In a block 406, a second virtual machine function instruction is stored as a last instruction on the second trampoline page, the second virtual machine function instruction executable to configure access privileges of the guest according to a protected view. In an example, initialization module 120 stores a second virtual machine function instruction as a last instruction on the second trampoline page 210, the second virtual machine function instruction executable to configure access privileges of the guest according to the protected view 220.

In response to detecting an extended page fault violation while the trampoline view is active, blocks 408 and 410 may be executed. In block 408, the interrupt flag of the guest is cleared. In an example, interrupt controller 122 clears the interrupt flag of the guest. In a block 410, execution on an instruction following the clear interrupt flag instruction on the second trampoline page is entered. In an example, interrupt controller 122 enters execution on an instruction following the clear interrupt flag instruction on the second trampoline page 210. For example, hypervisor 108 may reenter execution on the instruction following the clear interrupt flag instruction, and an exit to the guest may occur. The guest may reenter and resume execution of the next instruction to be executed, which is the instruction following the clear interrupt flag instruction.

It is also understood that additional processes may be inserted before, during, or after blocks 402-410 discussed above. It is also understood that one or more of the blocks of method 400 described herein may be omitted, combined, or performed in a different sequence as desired. For example, in response to detecting the extended page fault violation while the trampoline view is active, the hypervisor 108 may request an interrupt window exit to inject an interrupt. The hypervisor 108 may inject the interrupt into a domain of the guest via the interrupt window exit.

Figure 5:
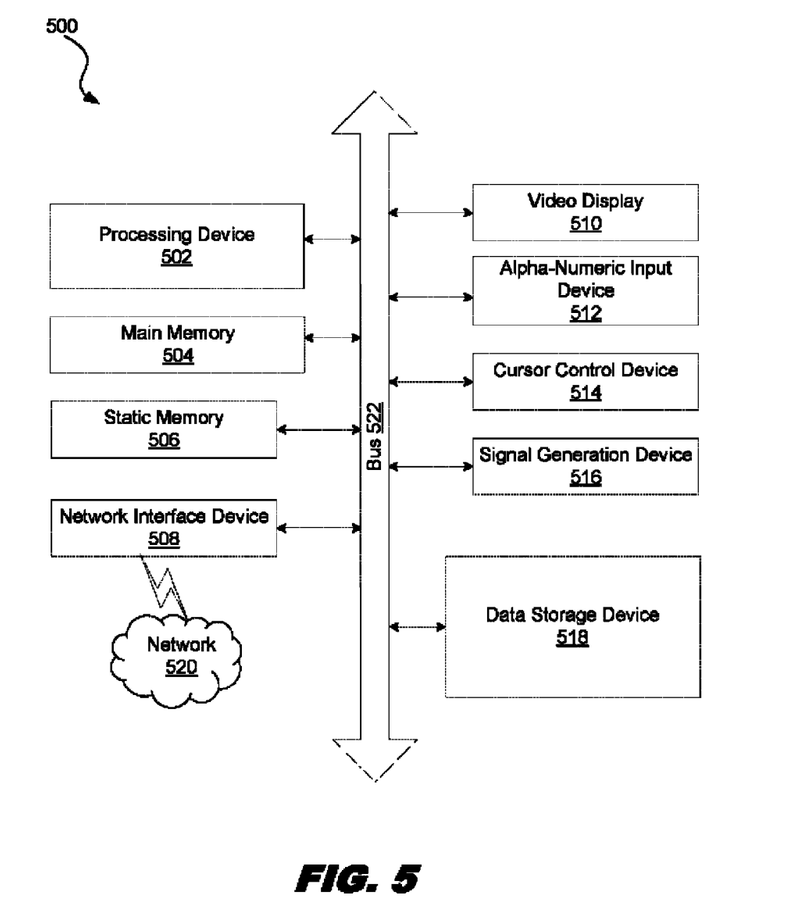
FIG. 5 is a block diagram illustrating a computer system that may perform one or more of the operations described herein, in accordance with various examples of the present disclosure.

FIG. 5 illustrates a diagram of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 522.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508. Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium that stores one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for secure virtual machine access to one or more protected virtual machine functions, comprising:
   storing, by a hypervisor, a first virtual machine function instruction as a last instruction on a first trampoline page, the first virtual machine function instruction executable to configure access privileges of a guest according to a trampoline view;
   storing a clear interrupt flag instruction as a first instruction on a second trampoline page;
   storing a second virtual machine function instruction as a last instruction on the second trampoline page, the second virtual machine function instruction executable to configure access privileges of the guest according to a protected view; and
   in response to detecting an extended page fault violation while the trampoline view is active:
      clearing, by the hypervisor, an interrupt flag of the guest; and
      entering execution on an instruction following the clear interrupt flag instruction on the second trampoline page.

2. The method of claim 1, further comprising:
   configuring a first virtual machine function page table to order the second trampoline page after the first trampoline page; and
   configuring a second virtual machine function page table to order one or more protected pages after the second trampoline page.

3. The method of claim 2, further comprising:
   detecting the extended page fault violation while the trampoline view is active; and
   in response to detecting the extended page fault violation while the trampoline view is active, requesting an interrupt window exit to inject an interrupt.

4. The method of claim 3, wherein execution of the second trampoline page while the guest is in user mode causes the extended page fault violation.

5. The method of claim 3, wherein a processor access to an interrupt descriptor table causes the extended page fault violation.

6. The method of claim 5, wherein executing the clear interrupt flag instruction from unprivileged code causes the processor to access the interrupt descriptor table.

7. The method of claim 5, wherein a hardware interrupt causes the processor to access the interrupt descriptor table.

8. The method of claim 7, wherein the hardware interrupt is a posted interrupt.

9. The method of claim 3, further comprising:
injecting the interrupt into a domain of the guest via the interrupt window exit.

10. The method of claim 9, wherein the protected view configures access privileges to allow execution of instructions from guest supervisor mode stored on the protected pages and the first trampoline page, and wherein the protected view is configured to prohibit execution from guest supervisor mode of instructions that are stored on at least one page other than the protected pages or the first trampoline page.

11. The method of claim 3, wherein entering execution on an instruction following the clear interrupt flag instruction includes an exit to the guest.

12. The method of claim 1, wherein the trampoline view configures access privileges to disallow reads and writes of any page.

13. The method of claim 1, wherein the one or more protected pages store instructions for a protected function.

14. The method of claim 1, wherein the protected view configures access privileges to allow execution of instructions stored on the protected pages and the first trampoline page, and wherein the protected view is configured to prohibit execution of instructions that are stored on at least one page other than the protected pages or the first trampoline page.

15. A system for secure virtual machine access to one or more protected virtual machine functions, comprising:
an initialization module that stores a first virtual machine function instruction as a last instruction on a first trampoline page, stores a clear interrupt flag instruction as a first instruction on a second trampoline page, and stores a second virtual machine function instruction as a last instruction on the second trampoline page, wherein the first virtual machine function instruction is executable to configure access privileges of a guest according to a trampoline view, and the second virtual machine function instruction is executable to configure access privileges of the guest according to a protected view; and
an interrupt controller that in response to detecting an extended page fault violation while the trampoline view is active, clears the interrupt flag of the guest and enters execution on an instruction following the clear interrupt flag instruction on the second trampoline page.

16. The system of claim 15, wherein the initialization module configures a first virtual machine function page table to order the second trampoline page after the first trampoline page and configures a second virtual machine function page table to order one or more protected pages after the second trampoline page.

17. The system of claim 16, wherein the trampoline page is a single page.

18. The system of claim 16, wherein the interrupt controller detects the extended page fault violation while the trampoline view is active, and wherein in response to detecting the extended page fault violation while the trampoline view is active, the interrupt controller requests an interrupt window exit to inject an interrupt, and wherein the interrupt controller injects the interrupt into a domain of the guest via the interrupt window exit.

19. A non-transitory machine-readable medium comprising a plurality of machine-readable instructions that when executed by one or more processors is adapted to cause the one or more processors to perform a method comprising:
storing a first virtual machine function instruction as a last instruction on a first trampoline page, the first virtual machine function instruction executable to configure access privileges of a guest according to a trampoline view;
storing a clear interrupt flag instruction as a first instruction on a second trampoline page;
storing a second virtual machine function instruction as a last instruction on the second trampoline page, the second virtual machine function instruction executable to configure access privileges of the guest according to a protected view; and
in response to detecting an extended page fault violation while the trampoline view is active:
clearing the interrupt flag of the guest;
requesting an interrupt window exit to inject an interrupt; and
entering execution on an instruction following the clear interrupt flag instruction on the second trampoline page.

20. The non-transitory machine-readable medium of claim 19, wherein the plurality of machine-readable instructions that when executed by one or more processors is adapted to cause the one or more processors to further perform the method comprising:
configuring a first virtual machine function page table to order the second trampoline page after the first trampoline page; and
configuring a second virtual machine function page table to order one or more protected pages after the second trampoline page.

* * * * *